United States Patent
Liu (10) Patent No.: US 11,991,747 B2
(45) Date of Patent: May 21, 2024

(54) METHOD AND DEVICE FOR RANDOM ACCESS ON UNLICENSED BAND

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 456 days.

(21) Appl. No.: 17/298,920

(22) PCT Filed: Jan. 17, 2019

(86) PCT No.: PCT/CN2019/072242
§ 371 (c)(1),
(2) Date: Jun. 1, 2021

(87) PCT Pub. No.: WO2020/147088
PCT Pub. Date: Jul. 23, 2020

(65) Prior Publication Data
US 2022/0070931 A1 Mar. 3, 2022

(51) Int. Cl.
*H04W 74/0816* (2024.01)
*H04W 72/0446* (2023.01)
(Continued)

(52) U.S. Cl.
CPC ... *H04W 74/0816* (2013.01); *H04W 72/0446* (2013.01); *H04W 74/0841* (2013.01); *H04W 74/0866* (2013.01)

(58) Field of Classification Search
None
See application file for complete search history.

(56) References Cited

U.S. PATENT DOCUMENTS

2018/0263059 A1* 9/2018 Rosa ................. H04L 5/001
2019/0029050 A1  1/2019 Li et al.

FOREIGN PATENT DOCUMENTS

| CN | 105682232 A | 6/2016 |
| CN | 107949067 A | 4/2018 |
| WO | 2017181124 A1 | 10/2017 |

OTHER PUBLICATIONS

International Search Report issued in PCT/CN2019/072242, dated Sep. 27, 2019 with English translation, (4p).
(Continued)

*Primary Examiner* — Christine T Duong
(74) *Attorney, Agent, or Firm* — Arch & Lake LLP (57) ABSTRACT

The present disclosure provides a method and device for random access. The method includes: a termina receives physical random access channel (PRACH) configuration information from a base station of the unlicensed band, where the PRACH configuration information indicates a first time-domain resource occupied by a PRACH, located after a second time-domain resource occupied by a discovery signal including a synchronization signal block (SSB) and transmitted by the base station to the terminal; the terminal determines, based on the PRACH configuration information, the first time-domain resource occupied by the PRACH; the terminal determines, based on the time interval duration between the first time-domain resource and the second time-domain resource, a target channel access mechanism employed; the terminal performs channel detection according to the target channel access mechanism, and transmits random access information to the base station on the basis of a channel detection result.

11 Claims, 4 Drawing Sheets

(51) Int. Cl.
*H04W 74/08* (2009.01)
*H04W 74/0833* (2024.01)

(56) References Cited

OTHER PUBLICATIONS

Nokia, et al., "Feature Lead's Summary on Channel Access Procedures", 3GPP TSG RAN WG1 Meeting #95, R1-1813994, Spokane, US, Nov. 16, 2018, (22p).

* cited by examiner

METHOD AND DEVICE FOR RANDOM ACCESS ON UNLICENSED BAND

CROSS REFERENCE TO RELATED APPLICATIONS

The present application is the US national phase application of International Application No. PCT/CN2019/072242, filed on Jan. 17, 2019, the entire content of which is incorporated herein by reference for all purposes.

TECHNICAL FIELD

The present disclosure relates to the field of communication technologies, and in particular, to a method, device, and storage medium for random access on an unlicensed frequency band.

BACKGROUND

The 5G New Radio (NR) system not only occupies the licensed frequency band for transmission, but also occupies the unlicensed frequency band for transmission, so as to improve the utilization of spectrum resources.

Unlicensed frequency bands are spectrum resources that can be used directly as long as they comply with regulations of the regulatory agency without requiring license from the regulatory agency. Terminals transmitting on unlicensed frequency bands need to follow the Listen before Talk (LBT) mechanism. That is, before occupying a certain time-frequency resource on an unlicensed frequency band to transmit information, a terminal using the unlicensed frequency band for transmission must execute the corresponding LBT process for channel detection according to certain channel access rules. If the channel detection result is idle, the terminal can use the time-frequency resources to be occupied to transmit information.

In addition, in a system where the unlicensed frequency band is independently networked, the terminal will establish a connection with the base station in the cell that uses the unlicensed frequency band through a random access process. In the process of initiating random access, the terminal will determine the target time-frequency resource required to send random access information according to the Physical Random Access Channel (PRACH) configuration information broadcast by the base station. After that, before occupying the target time-frequency resource to send random access information, the terminal first executes the LBT process for channel detection. If the channel detection result is idle, the terminal occupies the target time-frequency resource to send random access information to the base station. In addition, if the channel detection result is not idle, the terminal needs to perform LBT detection again and select an appropriate timing to initiate random access.

For terminals that use unlicensed frequency bands for transmission, the power consumption required for the random access process is relatively large, and the success rate is relatively low.

SUMMARY

According to a first aspect of embodiments of the present disclosure, there is provided a method for random access on an unlicensed frequency band. The method includes that a terminal receives PRACH configuration information sent by a base station of an unlicensed frequency band cell and determines the first time-domain resource occupied by PRACH based on the PRACH configuration information. The first time-domain resource is located after a second time-domain resource occupied by a discovery signal sent by the base station to the terminal. Further, the method includes that the terminal determines the target channel access mechanism employed based on the time interval duration between the first time-domain resource and the second time-domain resource, performs channel detection according to the target channel access mechanism, and sends random access information to the base station based on the channel detection result.

According to a second aspect of the embodiments of the present disclosure, there is provided a method for random access on an unlicensed frequency band. The method includes that a base station of an unlicensed frequency band cell sends PRACH configuration information to a terminal. The PRACH configuration information is configured to indicate a first time-domain resource occupied by PRACH, and the first time-domain resource is located after a second time-domain resource occupied by a discovery signal sent by the base station to the terminal.

Based on the first time-domain resource, the base station receives random access information sent by the terminal after channel detection using a target channel access mechanism. The target channel access mechanism is determined based on the time interval duration between the first time-domain resource and the second time-domain resource.

According to a third aspect of the embodiments of the present disclosure, there is provided a device for random access on an unlicensed frequency band. The device includes a processor and a memory configured to store instructions executable by the processor. The processor is configured to receive PRACH configuration information sent by a base station of an unlicensed frequency band cell and determine a first time-domain resource occupied by PRACH based on the PRACH configuration information. The first time-domain resource is located after a second time-domain resource occupied by a discovery signal sent by the base station to a terminal.

Further, the processor is configured to determine a target channel access mechanism employed based on a time interval duration between the first time-domain resource and the second time-domain resource, perform channel detection according to the target channel access mechanism, and send random access information to the base station based on a channel detection result.

According to a fourth aspect of the embodiments of the present disclosure, there is provided a device for random access on an unlicensed frequency band. The device includes a processor and a memory configured to store instructions executable by the processor. The processor is configured to send PRACH configuration information to a terminal. The PRACH configuration information is configured to indicate a first time-domain resource occupied by PRACH, and the first time-domain resource is located after a second time-domain resource occupied by a discovery signal sent by the base station to the terminal.

Further, the processor is configured to receive, based on the first time-domain resource, random access information sent by the terminal after channel detection using a target channel access mechanism. The target channel access mechanism is determined based on the time interval duration between the first time-domain resource and the second time-domain resource.

According to a fifth aspect of the embodiments of the present disclosure, there is provided a non-transitory computer-readable storage medium on which a computer program is stored. The computer program is configured to perform steps of the method as described in the first aspect, or steps of the method as described in the second aspect, when it is executed by a processor.

It should be understood that the above general description and the following detailed description are only exemplary and explanatory, and are not intended to limit the present disclosure.

BRIEF DESCRIPTION OF THE DRAWINGS

The drawings herein are incorporated into the specification and constitute a part of the specification, show embodiments consistent with the present disclosure, and are used together with the specification to explain the principle of the present disclosure.

DETAILED DESCRIPTION OF THE EMBODIMENTS

The exemplary embodiments will be described in detail here, and examples thereof are shown in the accompanying drawings. When the following description refers to the drawings, unless otherwise indicated, the same numbers in different drawings indicate the same or similar elements. The implementations described in the following exemplary embodiments do not represent all implementations consistent with the present disclosure. Rather, they are merely examples of devices and methods consistent with some aspects of the present disclosure as detailed in the appended claims.

Before introducing and explaining embodiments of the present disclosure, firstly, the channel access mechanism involved in the present disclosure will be explained.

Channel access mechanisms usually include the following 4 types.

The first type (Cat.1) does not contain Listen before talk (LBT). That is, the device does not need to perform channel detection before transmitting information, thus sending information directly. LBT can also be called a monitoring avoidance mechanism, which is used to realize the effective sharing of unlicensed spectrum. LBT requires the channel to be monitored before information is transmitted and Clear Channel Assessment (CCA) is performed, meaning that transmission is performed when the channel is guaranteed to be free.

The second type (LBT Cat.2) is an LBT mechanism without random backoff process. The device only needs to detect a time granularity before transmitting information. For example, the time granularity can be 25 us. If the channel is idle within this time granularity, the device can transmit information. Otherwise, the LBT execution fails and the device cannot transmit information.

The third type (LBT Cat.3) is a random backoff type of LBT mechanism having a fixed Contention Window Size (CWS), wherein the sending device first detects whether the channel is idle at the first time granularity. If it detects that the channel is idle, value of a random number N is selected in a competition window, and channel detection is performed with the second time granularity as the time granularity. Further, if the channel is detected to be idle at the second time granularity and the value of the random number is not 0, the value of the random number is decreased by 1, and channel detection is performed continuously with the second time granularity as the time granularity. By contrast, if the channel is detected to be busy at the second time granularity, channel detection is performed again with the first time granularity as the time granularity. At this time, if the channel is detected again at the first time granularity to be idle, and the value of the random number is not 0, then the value of the random number is reduced by 1, and the second time granularity is used as the time granularity for channel detection. It will not be indicated that channel is idle until the value of the random number is reduced to 0. Optionally, this LBT mode is limited to WIFI scenarios, and will not be used under LAA or NRU.

The fourth type (LBT Cat.4) is a random backoff type of LBT mechanism having a variable CWS. That is, on the basis of LBT Cat.3, the sending device can adjust the CWS according to the result of the previous transmission. For example, in the data transmitted within a reference time during the previous transmission, the proportion of data that was not received correctly is X. When X is greater than a threshold, the CWS value increases. In order to refine the parameter settings in the LBT process, four priority levels are set in LBT Cat.4, wherein each priority level corresponds to a different parameter configuration, and data transmissions of different service types correspond to different priority levels.

The principle of LBT Cat.4 is as follows. The device first detects whether the channel is idle at the first time granularity. If it detects that the channel is idle, it selects the value of a random number N in the first competition window, and uses the second time granularity as the time granularity for channel detection. If the channel is detected to be idle at the second time granularity and the value of the random number is not 0, then the value of the random number is decreased by 1, and the channel detection is continued with the second time granularity as the time granularity. If the channel is detected to be busy at the second time granularity, the channel detection will be performed again with the first time granularity as the time granularity. If the channel is detected to be idle again at the first time granularity and the value of the random number is not 0, the value of the random number will be decreased by 1, and channel detection is resumed with the second time granularity as the time granularity, until the value of the random number is decreased to 0, meaning that the channel is idle.

For example, if the first time granularity is 16 us+M*9 us, and the second time granularity is 9 us, it is first checked whether the channel is idle in 16 us+M*9 us. If the channel is idle, select the value of the random number N in the competition window, and then use 9 us as the granularity for detection. If the channel is idle, then N−1, and continue to use 9 us as the granularity for detection. Otherwise, 16 us+M*9 us is used as the granularity for channel detection.

When the detection channel is idle, then N−1, and the detection is resumed with 9 us as the granularity, until the random number is 0, meaning the channel is idle for use.

In the above case, the value of M is determined by $m_p$ in Table 1 and Table 2, and according to the different priority value for channel access p, the value of M will be different. Table 1 is configurations of four priority parameters for the downstream LBT Cat.4, and Table 2 is configurations of the four priority parameters for the upstream LBT Cat.4, wherein the two tables are only slightly different in configuration values.

TABLE 1

| priority value for channel access (p) | $m_p$ | $CW_{min,p}$ | $CW_{max,p}$ | $T_{mcot,p}$ | optional values for $CW_p$ |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

| priority value for channel access (p) | $m_p$ | $CW_{min,p}$ | $CW_{max,p}$ | $T_{mcot,p}$ | optional values for $CW_p$ |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

Among the access priorities for the four channels shown in Table 1 and Table 2, the smaller the p value, the higher the corresponding priority. $m_p$ is the number of Extended Clear Channel (ECCA) included in a delay time. Each delay time is composed of a fixed duration of 16 us and $m_p$ ECCAs, i.e., the first time granularity as described above. $CW_{min,p}$ and $CW_{max,p}$ are the minimum competition window value and the maximum competition window value. CWS in the LBT process is generated between these two values, and then the randomly generated backoff counter N from 0 to the generated competition window $CW_p$ determines the back-off time length in the LBT channel detection process. Besides, $T_{mcot,p}$ is the maximum time length of the channel that can be occupied after the LBT Cat.4 corresponding to each priority level is successfully executed. It can be seen from the above table that as compared to the priority levels 1 and 2, the execution time of the LBT process for the priority levels 3 and 4 is longer, and the chance for obtaining channel access is relatively low. In order to ensure fairness, the maximum transmission time that can be occupied by data transmission using these two priorities is also relatively long.

It should be noted that the above four channel access mechanisms are only exemplary introductions. With the evolution of communication technology, the above four channel access mechanisms may change, or new channel access mechanisms may emerge, but they are all applicable to the technical solutions as described in the present disclosure.

The network architecture and business scenarios as described in embodiments of the present disclosure are intended to more clearly illustrate the technical solutions of embodiments of the present disclosure, and do not constitute a limitation on the technical solutions provided by embodiments of the present disclosure. Those of ordinary skill in the art will know that with the evolution of the network architecture and the emergence of new business scenarios, the technical solutions provided by embodiments of the present disclosure are equally applicable to similar technical problems.

Figure 1:
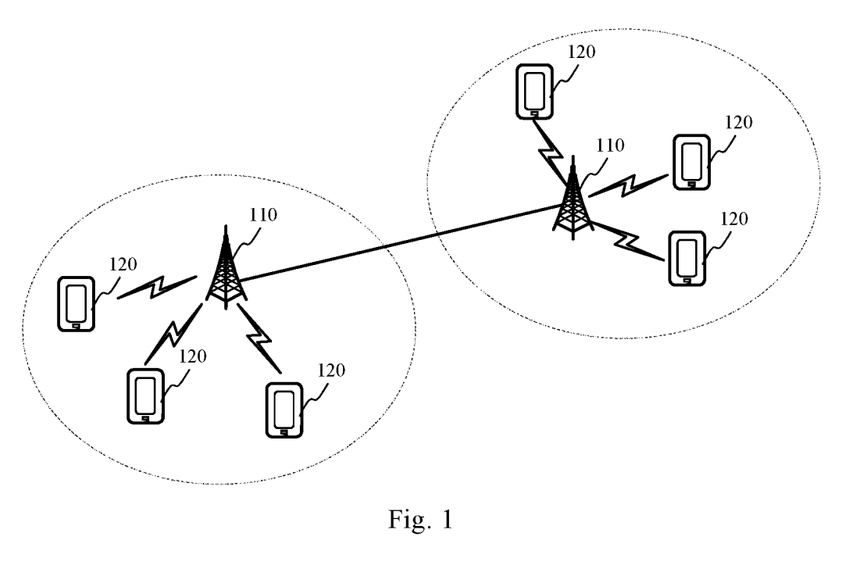
FIG. 1 is a schematic diagram showing a network architecture according to an exemplary embodiment.

FIG. 1 is a schematic diagram showing a network architecture according to an exemplary embodiment. The network architecture can include a base station 110 and a terminal 120.

The base station 110 is deployed in an access network. The access network in a 5G NR system can be called New Generation-Radio Access Network (NG-RAN). The base station 110 and the terminal 120 communicate with each other through a certain air interface technology. For example, they can communicate with each other through cellular technology.

The base station 110 is a device deployed in an access network to provide the terminal 120 with a wireless communication function. The base station 110 can include various forms of macro base stations, micro base stations, relay stations, access points, and so on. In systems using different wireless access technologies, the names of devices with base station functions may be different. For example, in 5G NR systems, they are called gNodeB or gNB. As communication technology evolves, the name "base station" may change. For ease of description, in embodiments of the present disclosure, the above-mentioned devices for providing wireless communication functions for the terminal 120 are collectively referred to as base stations.

There are usually multiple terminals 120, and one or more terminals 120 can be distributed in a cell managed by each base station 110. The terminal 120 can include various handheld devices with wireless communication functions, vehicle-mounted devices, wearable devices, computing devices or other processing devices connected to a wireless modem, as well as various forms of User Equipment (UE), Mobile Stations (MS), terminal device, etc. For ease of description, in embodiments of the present disclosure, the above-mentioned devices are collectively referred to as terminals.

The "5G NR system" in embodiments of the present disclosure can also be referred to as a 5G system or an NR system, and those skilled in the art can understand its meaning. The technical solutions described in embodiments of the present disclosure may be applicable to a 5G NR system, and can also be applicable to the subsequent evolution system of the 5G NR system.

Figure 2:
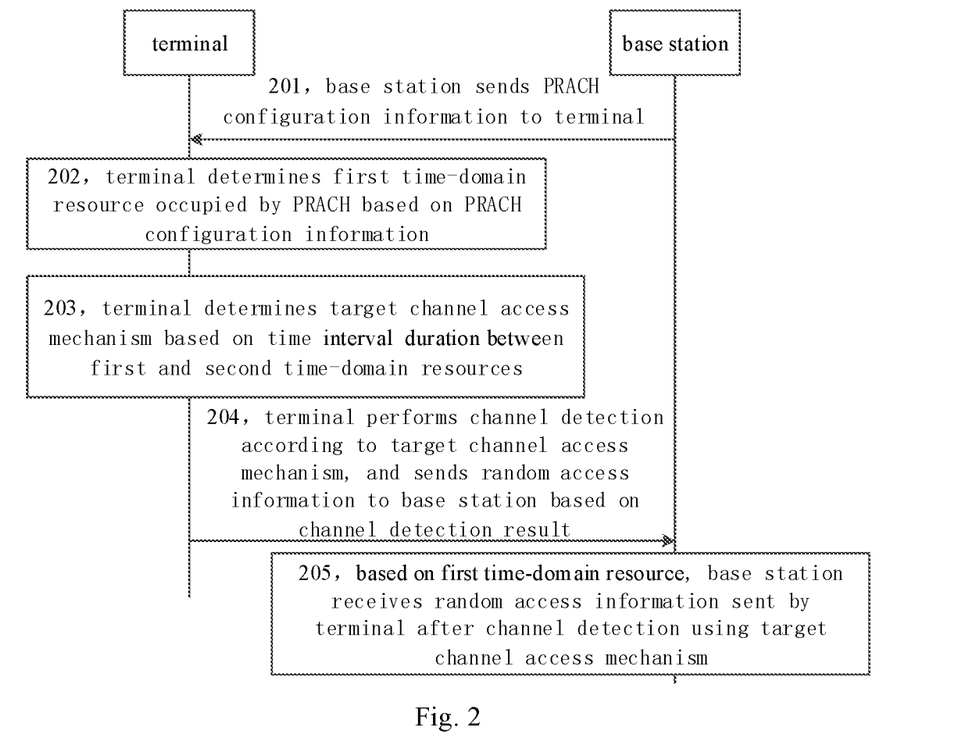
FIG. 2 is a flowchart showing a random access method on an unlicensed frequency band according to an exemplary embodiment.

FIG. 2 is a flowchart showing a random access method on an unlicensed frequency band according to an exemplary embodiment. This method can be applied to the network architecture shown in FIG. 1. The method can include the following steps (steps 201 to 205).

In step 201, the base station sends PRACH configuration information to the terminal.

Optionally, the base station is a base station of an unlicensed spectrum cell. An unlicensed spectrum cell refers to a cell that allows a terminal to use an unlicensed frequency band (or called an unlicensed spectrum) to communicate with a base station.

The PRACH configuration information is configured to indicate the target time-frequency resource occupied by PRACH, and the target time-frequency resource includes a first time-domain resource and a first frequency-domain resource. Optionally, the PRACH configuration information includes a PRACH configuration index, which indicates the target time-frequency resource occupied by PRACH, such as PRACH frequency-domain resource index, time-domain radio frame, half-frame, and subframe resource occupancy. After the PRACH configuration index is determined, the target time-frequency resource occupied by the PRACH can be determined, and the preamble format as used is also determined. In addition, the PRACH configuration information can also include configuration parameters such as zero correlation configuration, root sequence index, whether it is in a high-speed state, and frequency offset, which are not limited in embodiment of the present disclosure.

The base station can select a certain PRACH configuration to be used from multiple PRACH configurations specified in the protocol, and then send the PRACH configuration information corresponding to the selected PRACH configuration to the terminal. Optionally, the base station broadcasts PRACH configuration information to terminals in the cell in the form of a system message.

In addition, in conjunction with the technical solutions provided by the present disclosure, the PRACH configuration specified in the relevant protocol can be modified, so as to increase the target PRACH configuration. The target PRACH configuration specifies that the first time-domain resource occupied by the PRACH is located after the second time-domain resource occupied by the discovery signal sent by the base station to the terminal. In the above case, the discovery signal includes a synchronization signal block (SSB) or SS/PBCH block, and optionally also includes a reference signal or some other downlink signals. Of course, in some other embodiments, the discovery signal may not include the SSB. For example, the discovery signal includes the reference signal and/or some other downlink signals.

If the base station chooses to adopt the above-mentioned target PRACH configuration from the multiple PRACH configurations specified in the protocol, the base station sends the PRACH configuration information corresponding to the target PRACH configuration to the terminal. For example, the PRACH configuration information corresponding to the target PRACH configuration includes the PRACH configuration index corresponding to the target PRACH configuration. After receiving the PRACH configuration information corresponding to the target PRACH configuration, the terminal determines to use the target PRACH configuration to initiate random access.

Optionally, the relationship between the first time-domain resource occupied by the PRACH configured in the target PRACH configuration and the second time-domain resource occupied by the discovery signal can be different in the following situations. In an example, the first time slot to which the first time-domain resource belongs is a time slot after the second time slot to which the second time-domain resource belongs. In another example, the first time-domain resource and the second time-domain resource belong to the same time slot. In addition, there may be no OFDM symbols located between the first time-domain resource and the second time-domain resource. That is, there is no duration located between the first time-domain resource and the second time-domain resource. Alternatively, there is a time interval duration between the first time-domain resource and the second time-domain resource, and the time interval duration is not greater than 25 us. For example, there is an OFDM symbol located between the first time-domain resource and the second time-domain resource, and the length of the OFDM symbol is not greater than 25 us.

Figure 3:
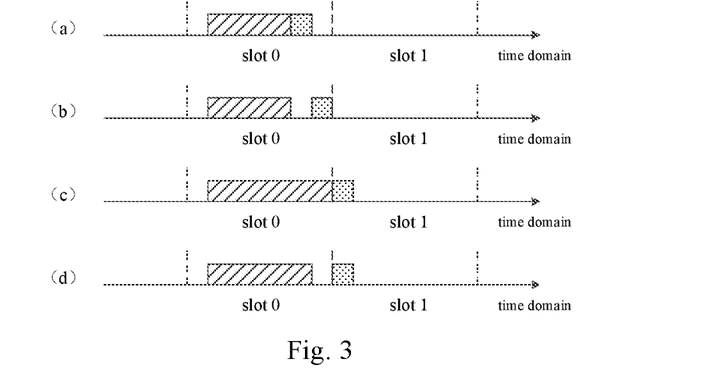
FIG. 3 exemplarily shows a schematic diagram of a time-domain positional relationship occupied by the PRACH and the discovery signal.

As shown in FIG. 3, it exemplarily shows several positional relationships between the first time-domain resource occupied by the PRACH and the second time-domain resource occupied by the discovery signal.

In part (a) of FIG. 3, the first time-domain resource occupied by PRACH and the second time-domain resource occupied by the discovery signal belong to the same time slot, and three is no OFDM symbol located between the first time-domain resource and the second time-domain resource. For example, the first time-domain resource occupied by PRACH (shown by black dots in the figure) and the second time-domain resource occupied by the discovery signal (shown by oblique lines in the figure) belong to the same slot 0, where the second time-domain resource occupies the second to fifth OFDM symbols in the slot 0, and the first time-domain resource occupies the sixth OFDM symbol in the slot 0. There is no OFDM symbol located between the first time-domain resource and the second time-domain resource.

In part (b) of FIG. 3, the first time-domain resource occupied by PRACH and the second time-domain resource occupied by the discovery signal belong to the same time slot, and there is an OFDM symbol located between the first time-domain resource and the second time-domain resource, where the length of the OFDM symbol is not greater than 25 us. For example, the first time-domain resource occupied by PRACH (shown by black dots in the figure) and the second time-domain resource occupied by the discovery signal (shown by oblique lines in the figure) belong to the same slot 0, where the second time-domain resource occupies the 2nd to 5th OFDM symbols in the slot 0, and the first time-domain resource occupies the 7th OFDM symbol in the slot 0, meaning that there is an OFDM symbol located between the first time-domain resource and the second time-domain resource.

In part (c) of FIG. 3, the first time-domain resource occupied by PRACH and the second time-domain resource occupied by the discovery signal belong to different time slots, and there is no OFDM symbol located between the first time-domain resource and the second time-domain resource. For example, the first time-domain resource occupied by PRACH (shown by black dots in the figure) belongs to the time slot 1, and the second time-domain resource occupied by the discovery signal (shown by oblique lines in the figure) belongs to the slot 0. The second time-domain resource occupies the second to seventh OFDM symbols in the slot 0. For example, SSB occupies the second to fifth OFDM symbols in the slot 0, and other reference signals occupies the sixth to seventh OFDM symbols in the slot 0. The first time-domain resource occupies the first OFDM symbol in the slot 1. There is no OFDM symbol located between the first time-domain resource and the second time-domain resource.

In part (d) of FIG. 3, the first time-domain resource occupied by PRACH and the second time-domain resource occupied by the discovery signal belong to different time slots, and there is an OFDM symbol located between the first time-domain resource and the second time-domain resource, wherein the length of the OFDM symbol is not greater than 25 us. For example, the first time-domain resource occupied by PRACH (shown by black dots in the figure) belongs to the slot 1, and the second time-domain resource occupied by the discovery signal (shown by oblique lines in the figure) belongs to the slot 0. The second time-domain resource occupies the second to sixth OFDM symbols in the slot 0. For example, SSB occupies the second to fifth OFDM symbols in the slot 0, and other reference signals occupy the sixth OFDM symbol in the slot 0. The first time-domain resource occupies the first OFDM symbol in the slot 1. There is an OFDM symbol located between the first time-domain resource and the second time-domain resource.

In some possible embodiments, considering that SSB occupies the 2nd to 5th OFDM symbols or the 8th to 11th OFDM symbols, the first time-domain resource occupied by PRACH can be configured to start from the 6th or 12th OFDM symbols.

In step 202, the terminal determines the first time-domain resource occupied by the PRACH based on the PRACH configuration information.

After receiving the PRACH configuration information, the terminal determines the target time-frequency resource occupied by the PRACH based on the PRACH configuration information. Optionally, the terminal determines the first time-domain resource and the first frequency-domain resource occupied by the PRACH based on the PRACH configuration information. For example, the terminal obtains the PRACH configuration index included in the PRACH configuration information, and then determines the target time-frequency resource occupied by the PRACH based on the PRACH configuration index. Exemplarily, assuming that the PRACH configuration information includes the PRACH configuration index corresponding to the target PRACH configuration as introduced above, the terminal uses the target PRACH configuration to initiate random access.

In step 203, the terminal determines the target channel access mechanism to be used based on the time interval duration between the first time-domain resource and the second time-domain resource.

In the case that the PRACH configuration as indicated by the PRACH configuration information is the target PRACH configuration introduced above, the terminal calculates the time interval duration between the first time-domain resource and the second time-domain resource based on the first time-domain resource occupied by PRACH and the second time-domain resource occupied by the discovery signal, and then the target channel access mechanism to be adopted is determined according to the time interval duration.

Optionally, if the time interval duration is not greater than the first threshold, the terminal determines that the target channel access mechanism is the LBT Cat.1 mechanism. Further, if the time interval duration is greater than the first threshold and not greater than the second threshold, the terminal determines that the target channel access mechanism is the LBT Cat.2 mechanism, where the first threshold is less than the second threshold. Optionally, the first threshold is 16 us and the second threshold is 25 us. In addition, if the time interval duration is greater than the second threshold, the terminal determines that the target channel access mechanism is the LBT Cat.4 mechanism.

In addition, when the length of the second time-domain resource occupied by the discovery signal is not greater than 1 ms, the terminal can select the LBT Cat.2 mechanism as the target channel access mechanism. Otherwise, the terminal selects the LBT Cat.4 mechanism as the target channel access mechanism. Further, if it is found that the sum of length of the second time-domain resource occupied by the discovery signal and length of the first time-domain resource occupied by the PRACH is not greater than 1 ms, the terminal can select the LBT Cat.1 mechanism as the target channel access mechanism.

In step 204, the terminal performs channel detection according to the target channel access mechanism, and sends random access information to the base station based on the channel detection result.

If the target channel access mechanism determined by the terminal is the LBT Cat.1 mechanism, the terminal does not perform the LBT detection process and directly sends random access information to the base station. If the target channel access mechanism determined by the terminal is the LBT Cat.2 mechanism, the terminal will perform channel detection according to the LBT detection process as specified by the LBT Cat.2 mechanism, and send random access to the base station when the channel detection result is idle. If the target channel access mechanism determined by the terminal is the LBT Cat.4 mechanism, the terminal will perform channel detection according to the LBT detection process specified by the LBT Cat.4 mechanism, and send random access to the base station when the channel detection result is idle.

Optionally, the random access information includes a random access preamble sequence, and the random access preamble sequence can be selected by the terminal according to the preamble format indicated by the base station in the PRACH configuration information. The terminal initiates a random access request to the base station by the random access information, so as to request for a connection with the base station.

In step 205, based on the first time-domain resource, the base station receives the random access information sent by the terminal after channel detection using the target channel access mechanism.

The base station receives the random access information sent by the terminal on the target time-frequency resource according to the target PRACH configuration configured for the terminal. For example, the base station receives the random access information sent by the terminal on the first time-domain resource and the first frequency-domain resource.

Optionally, before performing step 203, the terminal can also obtain the period corresponding to the discovery signal and the period corresponding to the PRACH. If the period corresponding to the discovery signal is found to overlap with the period corresponding to PRACH, the terminal starts to perform step 203. If it is found that the period corresponding to the discovery signal does not overlap with the period corresponding to PRACH, the terminal performs channel detection according to the default channel access mechanism, and sends random access information to the base station based on the channel detection result. Optionally, the default channel access mechanism is the LBT Cat.4 mechanism. That is, the terminal only selects the LBT Cat.1 mechanism or the LBT Cat.2 mechanism for channel detection when it finds that the period corresponding to the discovery signal overlaps with the period corresponding to the PRACH.

In addition, the PRACH transmission process is described above, and the PRACH retransmission process can also use the method flow introduced above, which is not limited in embodiments of the present disclosure.

In summary, in the technical solutions provided by embodiments of the present disclosure, the first time-domain resource occupied by PRACH is configured to lag behind the second time-domain resource occupied by the discovery signal, and after the terminal receives such PRACH configuration, the target channel access mechanism to be used can be determined according to the time interval duration between the first time-domain resource and the second time-domain resource. Then, channel detection can be performed according to the target channel access mechanism, and random access information is sent to the base station based on the channel detection result. This helps to provide a solution for dynamically adjusting the channel access mechanism according to the PRACH configuration, so that the terminal can select an appropriate channel access mechanism, thus reducing the power consumption required for the random access process and increasing the success rate.

In addition, if there is no time interval duration between the first time-domain resource and the second time-domain resource, or the time interval duration is short, the terminal can select the LBT Cat.1 mechanism or the LBT Cat.2 mechanism for channel detection. That is, a more efficient channel access mechanism can be selected, so as to reduce the power consumption required for the random access process.

It should be noted that, in the method embodiments of the present disclosure, the technical solutions of the present disclosure are introduced and explained only from the perspective of interaction between the terminal and the base station. The above steps performed by the relevant terminal can be separately implemented as a random access method on an unlicensed frequency band at the terminal side, and the above steps performed by the relevant base station can be separately implemented as a random access method on an unlicensed frequency band at the base station side.

The following are descriptions about device embodiments of the present disclosure, which can be used to implement the method embodiments of the present disclosure. For details that are not disclosed in the device embodiments of the present disclosure, please refer to the method embodiments of the present disclosure.

Figure 4:
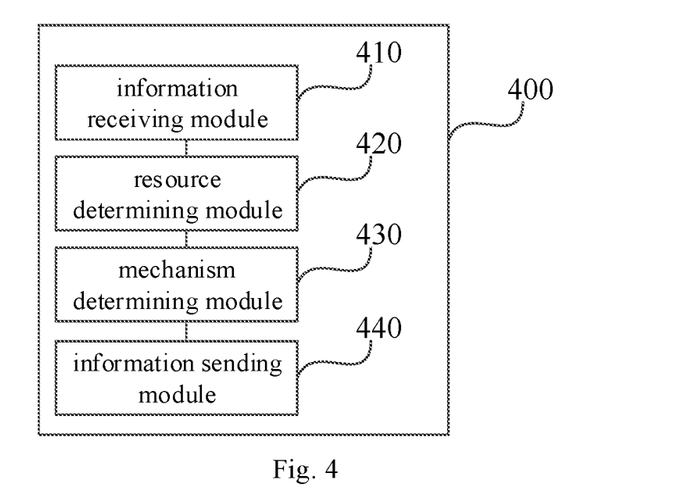
FIG. 4 is a block diagram showing a random access device on an unlicensed frequency band according to an exemplary embodiment.

FIG. 4 is a block diagram showing a random access device on an unlicensed frequency band according to an exemplary embodiment. The device is capable of realizing the above-mentioned method at the terminal side, and this can be realized by hardware, or by hardware executing corresponding software. The device can be the terminal described above, or set in the terminal. As shown in FIG. 4, the apparatus 400 can include an information receiving module 410, a resource determining module 420, a mechanism determining module 430, and an information sending module 440.

The information receiving module 410 is configured to receive PRACH configuration information sent by the base station. Optionally, the base station is a base station of an unlicensed frequency band cell.

The resource determining module 420 is configured to determine the first time-domain resource occupied by PRACH according to the PRACH configuration information, wherein, the first time-domain resource is located after the second time-domain resource occupied by the discovery signal sent by the base station to the terminal.

The mechanism determining module 430 is configured to determine the target channel access mechanism to be adopted according to the time interval duration between the first time-domain resource and the second time-domain resource.

The information sending module 440 is configured to perform channel detection according to the target channel access mechanism, and to send random access information to the base station based on the channel detection result.

In summary, in the technical solution provided by embodiments of the present disclosure, the first time-domain resource occupied by PRACH is configured to lag behind the second time-domain resource occupied by the discovery signal, and after the terminal receives such PRACH configuration, the target channel access mechanism to be used can be determined according to the time interval duration between the first time-domain resource and the second time-domain resource. Then, channel detection can be performed according to the target channel access mechanism, and the random access information is sent to the base station based on the channel detection result. This provides a solution for dynamically adjusting the channel access mechanism according to the PRACH configuration, so that the terminal can select an appropriate channel access mechanism, thus helping to reduce the power consumption required for the random access process and increasing the success rate.

In a possible example, the mechanism determining module 430 is configured to:
calculate the length of the time interval duration between the first time-domain resource and the second time-domain resource;
determine that the target channel access mechanism is the LBT Cat.1 mechanism, if the time interval duration is not greater than the first threshold; and
determine that the target channel access mechanism is the LBT Cat.2 mechanism, if the time interval duration is greater than the first threshold and not greater than the second threshold, wherein the first threshold is less than the second threshold.

In another possible example, the device 400 further includes: a period acquisition module (not shown in FIG. 4).

The period obtaining module is configured to obtain the period corresponding to the discovery signal and the period corresponding to the PRACH.

The mechanism determining module 430 is further configured to determine the target channel access mechanism to be adopted according to the time interval duration between the first time-domain resource and the second time-domain resource, if the period corresponding to the discovery signal overlaps with the period corresponding to the PRACH.

The information sending module 440 is further configured to perform channel detection according to the default channel access mechanism, and to send the random access information to the base station based on the channel detection result, if the period corresponding to the discovery signal does not overlap with the period corresponding to the PRACH.

Figure 5:
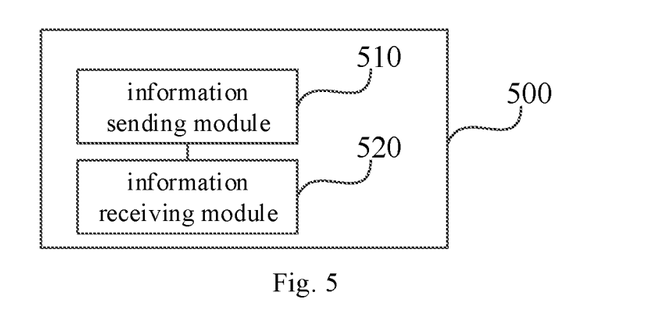
FIG. 5 is a block diagram showing a random access device on an unlicensed frequency band according to another exemplary embodiment.

FIG. 5 is a block diagram showing a random access device on an unlicensed frequency band according to another exemplary embodiment. The device is capable of realizing the above-mentioned method at the base station side, and this can be realized by hardware, or by hardware executing corresponding software. The device can be the base station described above, or set in the base station. As shown in FIG. 5, the device 500 can include an information sending module and an information receiving module 520.

The information sending module 510 is configured to send PRACH configuration information to the terminal, where the PRACH configuration information is used to indicate the first time-domain resource occupied by PRACH, and the first time-domain resource is located after the second time-domain resource occupied by the discovery signal sent by the base station to the terminal.

The information receiving module 520 is configured to receive, according to the first time-domain resource, random access information sent by the terminal after channel detection using a target channel access mechanism, wherein the target channel access mechanism is determined based on the time interval duration between the first time-domain resource and the second time-domain resource.

In summary, in the technical solution provided by embodiments of the present disclosure, the first time-domain resource occupied by PRACH is configured to lag behind the second time-domain resource occupied by the discovery signal, and after the terminal receives such PRACH configuration, the target channel access mechanism to be used can be determined, according to the time interval duration between the first time-domain resource and the second time-domain resource. Then, channel detection can be performed according to the target channel access mechanism, and the random access information is sent to the base station based on the channel detection result. This provides a solution for dynamically adjusting the channel access mechanism according to the PRACH configuration, so that the terminal can select an appropriate channel access mechanism, thus helping to reduce the power consumption required for the random access process and increase the success rate.

An exemplary embodiment of the present disclosure also provides a device for random access on an unlicensed frequency band. The device can be the terminal described above, or set in the terminal. The device can implement the random access method on the unlicensed frequency band at the terminal side provided by the present disclosure. The device can include a processor, and a memory for storing instructions executable by the processor. To be specific, the processor is configured to:

receive PRACH configuration information sent by the base station;

determine the first time-domain resource occupied by PRACH according to the PRACH configuration information, wherein the first time-domain resource is located after the second time-domain resource occupied by the discovery signal sent by the base station to the terminal;

determine the target channel access mechanism to be used according to the time interval duration between the first time-domain resource and the second time-domain resource; and perform channel detection according to the target channel access mechanism, and send random access information to the base station based on the channel detection result.

Optionally, the processor is configured to:

calculate the length of the time interval duration between the first time-domain resource and the second time-domain resource;

determine that the target channel access mechanism is the LBT Cat.1 mechanism, if the time interval duration is not greater than the first threshold; and determine that the target channel access mechanism is the LBT Cat.2 mechanism, if the time interval duration is greater than the first threshold and not greater than the second threshold, wherein the first threshold is less than the second threshold.

Optionally, the processor is further configured to:

acquire the period corresponding to the discovery signal and the period corresponding to the PRACH;

if the period corresponding to the discovery signal overlaps with the period corresponding to the PRACH, determine that steps of the target channel access mechanism to be used start to execute, according to the time interval duration between the first time-domain resource and the second time-domain resource;

if the period corresponding to the discovery signal does not overlap with the period corresponding to the PRACH, perform channel detection according to a default channel access mechanism, and send the random access information to the base station based on the channel detection result.

The foregoing mainly introduces the technical solutions provided by embodiments of the present disclosure from the perspective of the terminal and the base station. It can be understood that, in order to implement the above-mentioned functions, the terminal and the base station include hardware structures and/or software modules corresponding to each function. In combination with the units and algorithm steps of the examples described in embodiments disclosed in the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the protection scope of the technical solutions of embodiments of the present disclosure.

Figure 6:
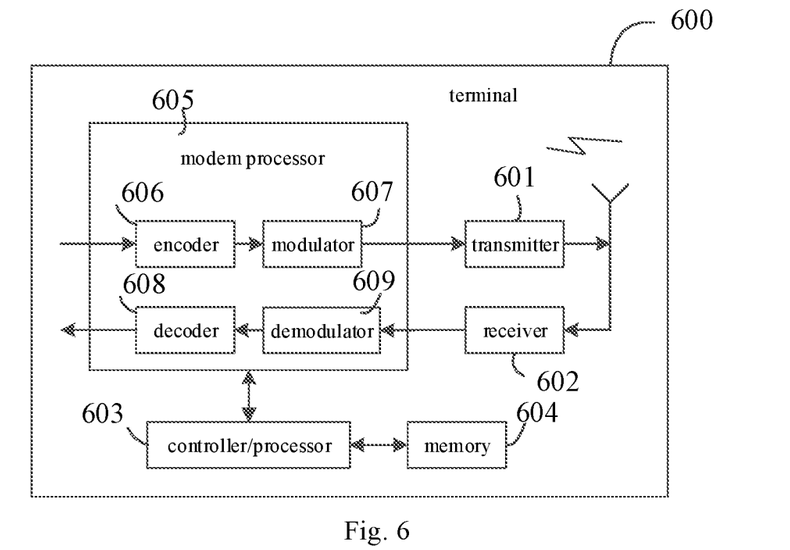
FIG. 6 is a schematic structural diagram showing a terminal according to an exemplary embodiment.

FIG. 6 is a schematic structural diagram showing a terminal according to an exemplary embodiment.

The terminal 600 includes a transmitter 601, a receiver 602, and a processor 603. The processor 603 can also be a controller, which is represented as "controller/processor 603" in FIG. 6. Optionally, the terminal 600 can further include a modem processor 605, where the modem processor 605 can include an encoder 606, a modulator 607, a decoder 608, and a demodulator 609.

In an example, the transmitter 601 adjusts the output samples and generates an uplink signal (e.g., by analog conversion, filtering, amplification, and up-conversion, etc.), which uplink signal is transmitted to the base station via an antenna. On the downlink channel, the antenna receives the downlink signal transmitted by the base station. The receiver 602 adjusts (e.g., filters, amplifies, down-converts, and digitizes, etc.) the signal received from the antenna and provides input samples. In the modem processor 605, the encoder 606 receives service data and signaling messages to be sent on the uplink channel, and processes (for example, formatting, encoding, and interleaving) the service data and signaling messages. The modulator 607 further processes the encoded service data and signaling messages (for example, by symbol mapping and modulation) and provides output samples. The demodulator 609 processes (e.g., demodulates) the input samples and provides symbol estimates. The decoder 608 processes (e.g., deinterleaves and decodes) the symbol estimates and provides decoded data and signaling messages sent to the terminal 600. The encoder 606, the modulator 607, the demodulator 609, and the decoder 608 can be implemented by a synthesized modem processor 605. These units perform processing according to the radio access technology adopted by the radio access network (for example, 5G NR and other evolved system access technologies). It should be noted that when the terminal 600 does not include the modem processor 605, the foregoing functions of the modem processor 605 can also be performed by the processor 603.

The processor 603 controls and manages actions of the terminal 600, and is used to execute the processing procedure performed by the terminal 600 in the foregoing embodiments of the present disclosure. For example, the processor 603 is further configured to execute various steps at the terminal side in the foregoing method embodiments, and/or other steps of the technical solutions described in embodiments of the present disclosure.

Further, the terminal 600 can further include a memory 604, and the memory 604 is configured to store program codes and data for the terminal 600.

It can be understood that FIG. 6 only shows a simplified design of the terminal 600. In practical applications, the terminal 600 can include any number of transmitters, receivers, processors, modem processors, memories, etc., and all terminals that can implement embodiments of the present disclosure are within the protection scope of embodiments of the present disclosure.

Figure 7:
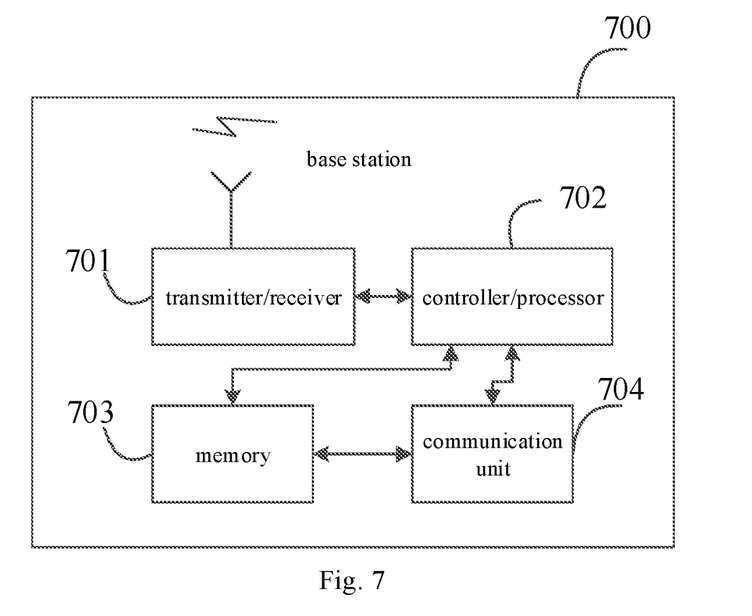
FIG. 7 is a schematic structural diagram showing a base station according to an exemplary embodiment.

FIG. 7 is a schematic structural diagram showing a base station according to an exemplary embodiment.

The base station 700 includes a transmitter/receiver 701 and a processor 702. The processor 702 can also be a controller, which is represented as "controller/processor 702" in FIG. 7. The transmitter/receiver 701 is used to support sending and receiving information between the base station and the terminal in the foregoing embodiments, and to support communication between the base station and other network entities. The processor 702 performs various functions for communicating with the terminal. In the uplink channel, the uplink signal from the terminal is received via the antenna, demodulated by the receiver 701 (for example, the high-frequency signal is demodulated into a baseband signal), and further processed by the processor 702, so as to restore the service data and signaling information sent by the terminal. On the downlink channel, service data and signaling messages are processed by the processor 702, and modulated by the transmitter 701 (for example, the baseband signal is modulated into a high-frequency signal), so as to generate a downlink signal, which is transmitted to the terminal via an antenna. It should be noted that the above-mentioned demodulation or modulation function can also be completed by the processor 702. For example, the processor 702 is further configured to execute various steps at the base station side in the foregoing method embodiments, and/or other steps of the technical solutions described in embodiments of the present disclosure.

Further, the base station 700 can further include a memory 703, and the memory 703 is used to store program codes and data of the base station 700. In addition, the base station can further include a communication unit 704. The communication unit 704 is used to support communication between the base station and other network entities (for example, network devices in the core network, etc.). For example, in a 5G NR system, the communication unit 704 can be an NG-U interface for supporting communication between the base station and an entity having User Plane Function (UPF). Alternatively, the communication unit 704 can also be an NG-C Interface used to support communication with entities having Access and Mobility Management Function (AMF).

It is understandable that FIG. 7 only shows a simplified design of the base station 700. In practical applications, the base station 700 can include any number of transmitters, receivers, processors, controllers, memories, communication units, etc., and all base stations that can implement embodiments of the present disclosure are within the protection scope of embodiments of the present disclosure.

An exemplary embodiment of the present disclosure also provides a non-transitory computer-readable storage medium on which a computer program is stored. When the computer program is executed by the processor of the terminal, steps of the method for random access on the unlicensed frequency band is implemented at the terminal side.

Another exemplary embodiment of the present disclosure also provides a non-transitory computer-readable storage medium on which a computer program is stored. When the computer program is executed by the processor of the base station, steps of the method for random access on the unlicensed frequency band is implemented at the base station side.

It should be understood that the wording of "plurality" mentioned herein refers to two or more. The wording of "and/or" describes the association relationship between the associated objects, indicating that there can be three types of relationships. For example, the phrase of A and/or B can mean: A alone exists, A and B exist at the same time, and B exists alone. The character "/" generally indicates that the associated objects before and after such character are in an "or" relationship.

Those skilled in the art will easily think of other embodiments of the present disclosure after considering the specification and practicing the present invention disclosed herein. The present disclosure is intended to cover any variations, uses, or adaptive changes of the present disclosure. These variations, uses, or adaptive changes follow the general principle of the present disclosure and include common knowledge or conventional technical means in the technical field that are not disclosed in the present disclosure. The above description and embodiments are to be regarded as exemplary only, and the true scope and spirit of the present disclosure are pointed out by the following claims.

It should be understood that the present disclosure is not limited to the precise structure that has been described above and shown in the drawings, and various modifications and changes can be made without departing from its scope. The scope of the present disclosure is only limited by the appended claims.

The invention claimed is:

1. A method for random access, comprising:
   receiving, by a terminal, physical random access channel (PRACH) configuration information sent by a base station of an unlicensed frequency band cell;
   determining, by the terminal, a first time-domain resource occupied by PRACH based on the PRACH configuration information, wherein the first time-domain resource is located after a second time-domain resource occupied by a discovery signal sent by the base station to the terminal;
   determining, by the terminal, a target channel access mechanism employed based on a time interval duration between the first time-domain resource and the second time-domain resource;
   performing, by the terminal, channel detection according to the target channel access mechanism, and sending, by the terminal, random access information to the base station based on a channel detection result;
   acquiring, by the terminal, a period corresponding to the discovery signal and a period corresponding to the PRACH;
   in response to determining that the period corresponding to the discovery signal overlaps with the period corresponding to the PRACH, determining, by the terminal, from the time interval duration between the first time-domain resource and the second time-domain resource that steps of the target channel access mechanism employed start to execute; and
   in response to determining that the period corresponding to the discovery signal does not overlap with the period corresponding to the PRACH, performing, by the terminal, the channel detection according to a default channel access mechanism, and sending, by the terminal, the random access information to the base station based on the channel detection result.

2. The method according to claim 1, wherein
   a first time slot is a time slot after a second time slot, wherein the first time-domain resource belongs to the first time slot, and the second time-domain resource belongs to the second time slot, or the first time-domain resource and the second time-domain resource belong to a same time slot.

3. The method according to claim 1, wherein no Orthogonal Frequency Division Multiplexing (OFDM) symbol is located between the first time-domain resource and the second time-domain resource.

4. The method according to claim 1, wherein the time interval duration between the first time-domain resource and the second time-domain resource is not greater than us.

5. The method according to claim 1, wherein determining, by the terminal, the target channel access mechanism employed based on the time interval duration between the first time-domain resource and the second time-domain resource comprises:

calculating, by the terminal, the time interval duration between the first time-domain resource and the second time-domain resource;

determining, by the terminal, that the target channel access mechanism is a Listen before Talk (LBT) Cat.1 mechanism in response to determining that the time interval duration is not greater than a first threshold; and determining, by the terminal, that the target channel access mechanism is an LBT Cat.2 mechanism in response to determining that the time interval duration is greater than the first threshold and not greater than a second threshold, wherein the first threshold is less than the second threshold.

6. A method for random access, comprising:

sending, by a base station of an unlicensed frequency band cell, physical random access channel (PRACH) configuration information to a terminal, wherein the PRACH configuration information is configured to indicate a first time-domain resource occupied by PRACH, and the first time-domain resource is located after a second time-domain resource occupied by a discovery signal sent by the base station to the terminal; and based on the first time-domain resource, receiving, by the base station, random access information sent by the terminal after channel detection using a target channel access mechanism, wherein the target channel access mechanism is determined based on a time interval duration between the first time-domain resource and the second time-domain resource, wherein in response to a period corresponding to the discovery signal overlapping with a period corresponding to the PRACH, it is determined from the time interval duration between the first time-domain resource and the second time-domain resource that steps of the target channel access mechanism employed start to execute, wherein the period corresponding to the discovery signal and the period corresponding to the PRACH are acquired by the terminal; and the method further comprises:

in response to the period corresponding to the discovery signal not overlapping with the period corresponding to the PRACH, receiving, by the base station, the random access information sent by the terminal after the channel detection using a default channel access mechanism.

7. The method according to claim 6, wherein a first time slot is a time slot after a second time slot, wherein the first time-domain resource belongs to the first time slot, and the second time-domain resource belongs to the second time slot, or the first time-domain resource and the second time-domain resource belong to a same time slot.

8. The method according to claim 6, wherein no Orthogonal Frequency Division Multiplexing (OFDM) symbol is located between the first time-domain resource and the second time-domain resource.

9. The method according to claim 6, wherein the time interval duration between the first time-domain resource and the second time-domain resource is not greater than 25 us.

10. A device for random access-ea, comprising:

a processor; and a memory, configured to store instructions executable by the processor, wherein the processor is configured to:

receive physical random access channel (PRACH) configuration information sent by a base station of an unlicensed frequency band cell;

determine a first time-domain resource occupied by PRACH based on the PRACH configuration information, wherein the first time-domain resource is located after a second time-domain resource occupied by a discovery signal sent by the base station to a terminal;

determine a target channel access mechanism employed based on a time interval duration between the first time-domain resource and the second time-domain resource;

perform channel detection according to the target channel access mechanism, and send random access information to the base station based on a channel detection result;

acquire a period corresponding to the discovery signal and a period corresponding to the PRACH;

in response to determining that the period corresponding to the discovery signal overlaps with the period corresponding to the PRACH, determine from the time interval duration between the first time-domain resource and the second time-domain resource that steps of the target channel access mechanism employed start to execute;

in response to determining that the period corresponding to the discovery signal does not overlap with the period corresponding to the PRACH, perform the channel detection according to a default channel access mechanism, and send the random access information to the base station based on the channel detection result.

11. A device for random access on an unlicensed frequency band, comprising:

a processor; and a memory, configured to store instructions executable by the processor, wherein the processor is configured to perform the method according to claim 6.

* * * * *